Figure 1:
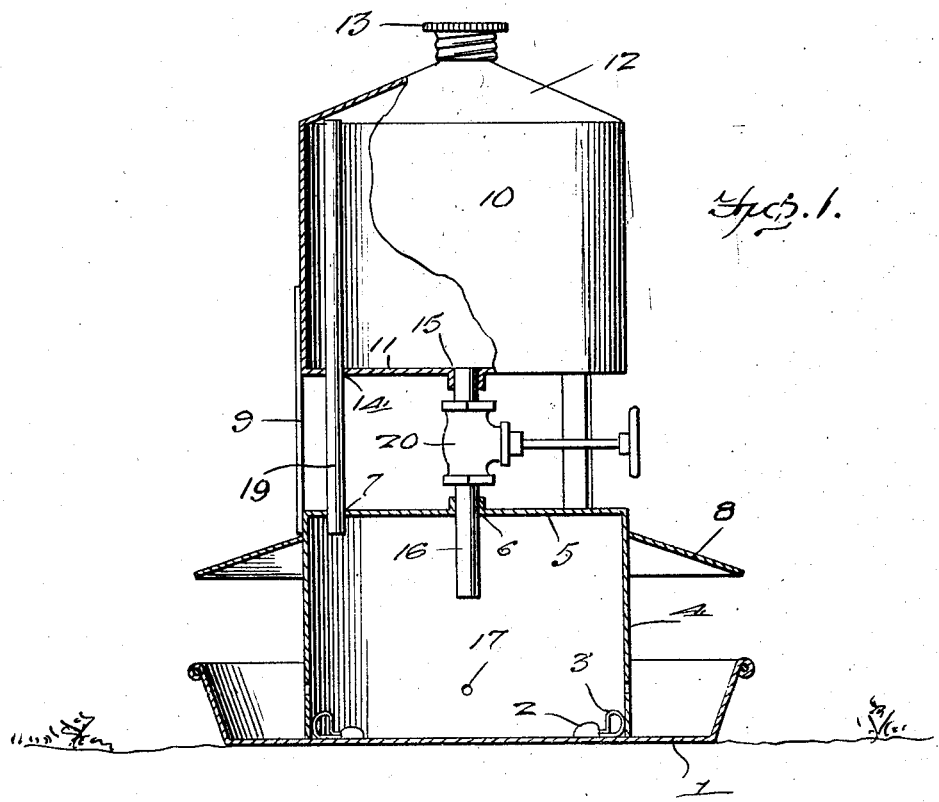

Nov. 10, 1925.

C. W. RANDALL

POULTRY DRINKING FOUNTAIN

Filed Feb. 24, 1925

1,560,729

Inventor
C. W. Randall
By
Clarence O'Brien
Attorney

Patented Nov. 10, 1925.

1,560,729

UNITED STATES PATENT OFFICE.

CLARENCE W. RANDALL, OF ELK, WASHINGTON.

POULTRY DRINKING FOUNTAIN.

Application filed February 24, 1925. Serial No. 11,306.

*To all whom it may concern:*

Be it known that I, CLARENCE W. RANDALL, a citizen of the United States, residing at Elk, in the county of Spokane and State of Washington, have invented certain new and useful Improvements in a Poultry Drinking Fountain, of which the following is a specification.

This invention appertains to watering devices designed chiefly for watering poultry and aims to provide an apparatus of this nature which, while structurally simple, inexpensive to manufacture, and unlikely to become easily out of order or service, is, nevertheless, strong, firm, durable, rigid, and well adapted for the purpose for which it is designed.

An important object of the invention is to provide a watering appliance of this nature which embodies the vacuum principle for maintaining drinking water in a drinking pan at a constant level.

A still further object of the invention is to provide a drinking fountain of this nature which is handy, easily manipulated, readily removable from the drinking pan for cleaning purposes, thereby being sanitary.

With the foregoing and numerous other objects in view as will appear as the description proceeds, the improvement resides in certain novel features of construction, and in the combination and arrangement of parts as will be hereinafter more fully described and claimed.

In the drawing

Figure 2:
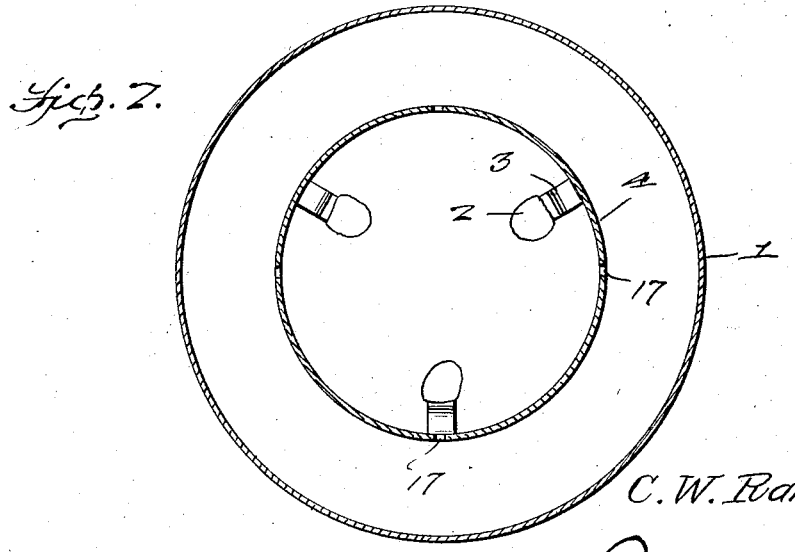

Figure 1 is a view of my improved drinking appliance showing the same in vertical section, and Fig. 2 is a horizontal section taken substantially on the line 2—2 of Fig. 1 looking downwardly.

Referring to the drawing in detail, it will be seen that 1 designates a drinking pan which may be of any desired formation and has provided on its bottom a plurality of spacing members 2 each of which includes a looped spring finger 3. These spring fingers 3 radiate from the center of the pan. These spacing members 2 are circularly arranged about the center of the pan and may be of any desired number.

A cylindrical tank 4 has its bottom end open and rests on the bottom of the pan 1 so that the spring fingers 3 engage the interior thereof. The top of the cylindrical tank 4 is closed as at 5. This closed end 5 is provided with the central opening 6 and the off center opening 7. A frusto-conical shaped hood 8 is formed on the exterior of the tank 4 adjacent its upper end so as to extend over and a distance above the pan 1.

A plurality of rods 9 are fixed to the exterior of the tank 4 and extend vertically thereof for supporting a supply tank 10 which, in the present embodiment of the invention, is cylindrical in formation, having its bottom closed as at 11 and its top tapered to form a frusto-conical portion which is inverted as shown at 12 having the upper or smaller end thereof capped as at 13. The bottom 11 of the tank 10 is provided with the off center opening 14 registering vertically with the opening 7 and the central opening 15 registering vertically with the opening 6.

A pipe 16 extends through openings 6 and 15 and terminates at its bottom end intermediate the top 5 and the bottom of pan 1. The tank 4 is provided with an annular series of openings 17 at a distance above its lower edge and a distance below the upper edge of the pan 1. The bottom terminal of the pipe 16 is disposed above these openings 17.

A pipe 19 extends through openings 7 and 14 terminating at its lower end in the upper portion of the tank 4 and at its upper end in the upper portion 12 of the tank 10.

In using this watering appliance it is assembled with the pan 1 as is indicated to advantage in Fig. 1. The valve 20 in the pipe 16 is then closed and the cap 13 removed. The supply tank 10 may then be filled with the drinking water so that the level thereof will be disposed a little below the upper end of the pipe 19. The cap 13 is then replaced on the tank 10 and the valve 20 opened so that the water will flow through the pipe 16 and partially fill tank 4 and the pan 1.

It will be seen that as the water rises in tank 1 above the openings 17, that a vacuum is being formed in tank 10 which will allow atmospheric pressure to maintain the water in pan 1 at a constant level. When the water in tank 1 recedes below the opening 17 air is thus allowed to be delivered into tank 4 and vent pipe 19 into tank 10, thus relieving the vacuum sufficiently to raise the level in the pan 1.

From the above description it will be seen that the present embodiment of the invention which I have described by way of example attains all the features of advantage enumerated as desirable in the statement of the invention and in the above description and that the device is capable of being easily lifted out of the pan after the valve 20 is closed in order that the pan may be cleaned.

It will further be noted that the device cannot be upset by the poultry and requires practically no attention whatsoever except for replenishing the supply in the tank 10 which may be done by removing the device from the pan 1 if desired, thereby eliminating any chance of water being spilt about the drinking pan.

It will be apparent that numerous changes in the details of construction, in the materials, in the dimensions, and in the combination and arrangement of parts may be resorted to without departing from the spirit or scope of the invention as hereinafter claimed or sacrificing any of its advantages.

Having thus described my invention, what I claim as new is:—

1. In combination, a drinking pan having on its bottom a circular series of spacing elements embodying spring fingers, a cylindrical tank provided with a bottom open end for resting on the bottom of the pan so that the spring fingers engage the interior thereof, said tank provided with a plurality of openings in its side disposed between the top and bottom of the pan, a supply tank mounted above the first mentioned tank, a pipe communicating the two tanks, and a valve in said pipe.

2. In combination, a drinking pan having on its bottom a circular series of spacing elements embodying spring fingers, a cylindrical tank provided with a bottom open end for resting on the bottom of the pan so that the spring fingers engage the interior thereof, said tank provided with a plurality of openings in its side disposed between the top and bottom of the pan, a supply tank mounted above the first mentioned tank, a pipe communicating the two tanks, a valve in said pipe, a vent pipe connecting the two tanks terminating at its bottom end in the upper portion of the lower tank and at its upper end in the upper portion of the upper tank.

3. A poultry drinking fountain including a lower tank and an upper tank, a plurality of rods spacing the tanks from each other, a vent pipe extending into the tanks and terminating in the upper portion of the lower tank and in the upper portion of the upper tank, a second pipe extending into the tanks terminating in the lower portion of the upper tank and in the intermediate portion of the lower tank, and a valve in said second pipe.

In testimony whereof I affix my signature.

CLARENCE W. RANDALL.